(12) United States Patent
Shelton et al.

(10) Patent No.: US 12,025,990 B2
(45) Date of Patent: Jul. 2, 2024

(54) AUTOMATIC CONTROL OF POSITIONING OF MATERIAL TRANSFER VEHICLE DURING A PAVING OPERATION

(71) Applicant: Roadtec, Inc., Chattanooga, TN (US)

(72) Inventors: Lillian Nichole Shelton, Whitwell, TN (US); John E. Hoffmann, Signal Mountain, TN (US); David Swearingen, Ooltewah, TN (US); Irina Brown, Dalton, GA (US); Kerry Malone, Chattanooga, TN (US); Oleg Tkachenko, Pembroke Pines, FL (US)

(73) Assignee: Roadtec, Inc., Chattanooga, TN (US)

( * ) Notice: Subject to any disclaimer, the term of this patent is extended or adjusted under 35 U.S.C. 154(b) by 892 days.

(21) Appl. No.: 16/544,403

(22) Filed: Aug. 19, 2019

(65) Prior Publication Data
US 2019/0377363 A1    Dec. 12, 2019

Related U.S. Application Data

(63) Continuation-in-part of application No. 15/791,942, filed on Oct. 24, 2017, now abandoned.

(60) Provisional application No. 62/423,933, filed on Nov. 18, 2016.

(51) Int. Cl.
*G05D 1/00* (2024.01)
*E01C 19/48* (2006.01)

(52) U.S. Cl.
CPC ......... *G05D 1/0293* (2013.01); *G05D 1/0088* (2013.01); *G05D 1/0231* (2013.01); *E01C 19/48* (2013.01)

(58) Field of Classification Search
CPC .. G05D 1/0293; G05D 1/0088; G05D 1/0231; G05D 2201/0202; E01C 19/48
See application file for complete search history.

(56) References Cited

U.S. PATENT DOCUMENTS

| | | | | |
|---|---|---|---|---|
| 5,921,708 A | * | 7/1999 | Grundl | G05D 1/0272 404/84.1 |
| 6,388,580 B1 | * | 5/2002 | Graham | G08G 1/166 340/904 |
| 8,337,118 B2 | * | 12/2012 | Buschmann | E01C 19/48 404/84.1 |
| 9,267,249 B2 | * | 2/2016 | Simon | E01C 23/088 |

(Continued)

*Primary Examiner* — Truc M Do
(74) *Attorney, Agent, or Firm* — Chambliss, Bahner & Stophel, P.C.; Stephen D. Adams

(57) ABSTRACT

An apparatus for controlling the movement of a material transfer vehicle with respect to the front end of a paving machine that is being operated by a driver/operator and is being supplied with asphalt paving material by the material transfer vehicle includes a controller that is mounted on the material transfer vehicle and is operatively connected to control mechanisms for controlling the speed and braking of the material transfer vehicle. A sensor is mounted on the material transfer vehicle and is operatively connected to the controller. The sensor is located and adapted to execute non-contact sensor scan passes across the front end of the paving machine to determine the distance from the sensor to the paving machine. The sensor is also adapted to communicate information to the controller about the distance from the sensor to the paving machine. The apparatus includes no components that are mounted on the paving machine.

19 Claims, 11 Drawing Sheets

(56) References Cited

U.S. PATENT DOCUMENTS

| | | | |
|---|---|---|---|
| 10,415,194 B2* | 9/2019 | Neumann | E01C 19/48 |
| 2010/0063663 A1* | 3/2010 | Tolstedt | G05D 1/0231 |
| | | | 701/41 |
| 2010/0152944 A1* | 6/2010 | Kouno | G05D 1/0244 |
| | | | 700/259 |
| 2011/0318102 A1* | 12/2011 | Utterodt | E01C 19/48 |
| | | | 404/83 |
| 2014/0118132 A1* | 5/2014 | Braunberger | B60Q 9/008 |
| | | | 340/463 |
| 2014/0268098 A1* | 9/2014 | Schwarz | G01S 7/4873 |
| | | | 356/5.01 |
| 2016/0170415 A1* | 6/2016 | Zahr | G05D 1/0293 |
| | | | 701/23 |
| 2017/0015291 A1* | 1/2017 | Kindberg | B60T 8/1701 |

* cited by examiner

AUTOMATIC CONTROL OF POSITIONING OF MATERIAL TRANSFER VEHICLE DURING A PAVING OPERATION

CROSS-REFERENCE TO RELATED APPLICATION

This application is a continuation-in-part of U.S. patent application Ser. No. 15/791,942 which was filed on Oct. 24, 2017 and claims the benefit of U.S. Provisional Patent Application No. 62/423,933 that was filed on Nov. 18, 2016.

FIELD OF THE INVENTION

The present invention relates generally to a method and apparatus for controlling the movement of a material transfer vehicle that is being used to supply asphalt paving material to an asphalt paving machine. More particularly, the invention relates to a method and apparatus for automatically controlling the speed and braking of a material transfer vehicle in order to keep it properly positioned with respect to an asphalt paving machine that is being operated by a driver/operator and is being supplied by the material transfer vehicle.

BACKGROUND OF THE INVENTION

The traditional process for paving roadways with asphalt paving material is generally carried out by an asphalt paving machine and a number of supply trucks which transport the asphalt paving material from an asphalt production plant to the paving machine. The paving machine generally is self-propelled and driven by a wheeled or tracked drive system. A hopper is located at the front end of the machine to receive asphalt paving material from a dump-type supply truck, and a floating screed is located at the rear end of the machine to form the asphalt mat. A conveyor delivers the asphalt paving material from the hopper to the road base just ahead of the screed, where a transversely oriented auger distributes the asphalt paving material across the roadway in front of the screed.

A typical asphalt paving machine has a hopper with a capacity of 5-15 tons, whereas a typical dump-type delivery truck has a capacity of about 20 tons. The front of the paving machine is usually provided with rollers which are adapted to engage the rear tires of a delivery truck. This arrangement allows for the transfer of asphalt paving material from the truck to the asphalt paving machine by positioning the delivery truck in front of the paving machine and raising the dump bed of the truck to dump the asphalt paving material into the hopper as the paving machine pushes the truck along in front of it. Because the delivery truck usually carries more asphalt paving material than the hopper can receive at one time, the paving machine may push the delivery truck along for several minutes while its internal conveyor transports the asphalt paving material out of the hopper to the roadway in front of the screed.

As is known to those having ordinary skill in the art to which the invention relates, when a paving machine stops, even for a short time, the screed will tend to settle into the freshly laid asphalt mat. Then, when the paving machine resumes its forward motion, the screed will tend to ride upwardly momentarily, thus depositing an excessive amount of asphalt paving material on the roadway. Consequently, stopping of the paving machine causes a depression and a bump in the surface of the asphalt mat, resulting in an uneven pavement surface. Therefore, in recent years, material transfer vehicles have been employed to shuttle asphalt paving material between the delivery trucks and the paving machine.

A self-propelled material transfer vehicle typically includes a large-capacity truck-receiving hopper and an inclined truck-unloading conveyor extending upwardly from this hopper. Asphalt paving material is dumped from a supply truck into the truck-receiving hopper. Thereafter, it is carried upwardly by the truck-unloading conveyor from the truck-receiving hopper and discharged off the elevated output end of the truck-unloading conveyor into a chute mounted on the lower end of a paver-loading conveyor, or into an intermediate surge hopper that is sized to hold the entire load of a delivery truck. The discharge of asphalt material off the elevated output end of the truck-unloading conveyor so that it may fall under the influence of gravity into a chute or surge hopper assists in preventing undesirable segregation of the various particulate components of the asphalt paving material by particle size.

Material transfer vehicles of the type that are equipped with a surge hopper typically include a conveyor in the surge hopper that is adapted to transfer the asphalt paving material to a paver-loading conveyor. Paver-loading conveyors mounted on material transfer vehicles with and without surge hoppers are generally pivotable about a generally vertical axis so that the transfer vehicle can be positioned alongside an asphalt paving machine that is laying an asphalt mat and rapidly discharge asphalt paving material into the hopper of the paving machine as the material transfer vehicle moves with the paving machine along the roadway. Because of its rapid loading and unloading capabilities, a material transfer vehicle can rapidly shuttle between delivery trucks at a pick-up point and an asphalt paving machine that is laying an asphalt mat at a paving site so that there is less likelihood that the paving machine will have to stop paving because of a lack of asphalt paving material.

As is known to those having ordinary skill in the art to which the invention relates, it is critically important to the asphalt paving process to control the speed of the paving machine. When the paving machine does not maintain a constant speed, it is difficult to control the thickness of the asphalt mat. Changing the speed of the paving machine without adjusting the amount of asphalt material being discharged by the distributing auger will cause the screed to ride higher or lower on the asphalt mat, thereby creating inconsistent mat thickness in the finished roadway.

Because a material transfer vehicle can discharge its load of asphalt material into the hopper of the paving machine without coming into contact with the paving machine, proper operation of a material transfer vehicle will rarely cause the operator of the paving machine to change its speed during discharge of asphalt material into the paver hopper. However, in order for a material transfer vehicle to operate efficiently, it needs to closely match the speed of the paving machine while it is discharging asphalt paving material into the hopper of the paving machine. This is due to the fact that relative movement between the paver-loading conveyor of a material transfer vehicle and the paving machine that is being supplied thereby can cause unwanted size segregation to occur in the asphalt paving material being supplied to the asphalt paving machine. Furthermore, roadway and environmental conditions may make it necessary for the paving machine to operate at other than a constant speed while the material transfer vehicle is discharging asphalt paving material into the hopper of the paving machine. In addition, not all paving is carried out in a straight line, so paving machines and material transfer vehicles have to follow the contours of the roadway being paved. Therefore, considerable skill is required on the part of both the driver/operator of the paving machine and the driver/operator of the material transfer vehicle to insure that paving proceeds smoothly and efficiently. Consequently, it would be desirable if a more automated system could be developed that would make cooperation between a paving machine and a material transfer vehicle easier to accomplish.

U.S. Pat. No. 5,921,708 describes a control system for a paving convoy that includes at least one paving machine and a material transfer vehicle. The system allows the entire convoy to be controlled from the operator's cabin of one of the vehicles. Each of the controlled vehicles in the convoy includes an operational controller that is connected by a wired or wireless remote-control signal transmission path to a remote controller in the controlling vehicle. The remote controller transmits to each vehicle in the convoy all of the operating parameters that are necessary for maintaining a predetermined distance between the vehicles. A distance sensor on each vehicle is operatively connected to a speed correction device to maintain a constant distance between adjacent vehicles corresponding to a predetermined value.

U.S. Pat. No. 8,337,118 describes a system for controlling the distance between a material transfer vehicle and an asphalt paving machine. A first position sensor mounted on the discharge end of the paver-loading conveyor of the material transfer vehicle is directed towards two reference targets which are located on opposite sides of the rear end of the paving machine hopper. These reference targets are spaced apart far enough that they can be independently sensed by the first position sensor on the material transfer vehicle. The first position sensor determines the position of the discharge end of the paver-loading conveyor in, and transversely to, the direction of travel of the material transfer vehicle. A second position sensor is also mounted at or near the discharge end of the paver-loading conveyor of the material transfer vehicle and adapted to measure the distance between this second sensor and the mound of material in the hopper of the paving machine. The sensors are preferably laser or ultrasonic sensors and the reference targets are preferably reflectors. The positions determined by the sensors are compared in a processing unit of a control device with predetermined desired positions, which processing unit generates appropriate steering and/or drive speed commands for automatically controlling the position of the discharge end of the paver-loading conveyor of the material transfer vehicle with respect to the paving machine.

U.S. Pat. No. 10,001,783 describes a system for automatically controlling the operation of an asphalt paving machine in a work train including a material transfer vehicle. The system includes a paver control device that is mounted on the paving machine and adapted to automatically control the movement of the paving machine so as to eliminate the requirement for a driver/operator for the paving machine. The system also includes one or more sensors that are mounted on one machine (either the paving machine or the material transfer vehicle), which sensors are adapted to determine the distance or distances to one or more reference points on the other (target) machine, and/or sensors that are mounted on both machines and adapted to determine the locations of the material transfer vehicle and the paving machine relative to an external reference system such as a global positioning system or a tachymeter installed at a construction site. The system also includes a data processing device which is configured to transmit travel commands to the paver control device based upon the distance or location data obtained by the sensors so that the paving machine may be controlled by the material transfer vehicle driving in front of it.

Prior art auto-tracking systems require that components be installed on the paving machine being supplied by the material transfer vehicle, or on both the material transfer vehicle and the paving machine. In addition, the sensor targets of prior art systems often get dirty, which makes it difficult or impossible for the sensors to "see" the target. Furthermore, sensors that are mounted on the discharge end of the paver-loading conveyor of the material transfer vehicle are difficult to access for servicing. In addition, a prior art system that eliminates the operator of the paving machine will create a great deal of additional work for the operator of the material transfer vehicle. In addition to insuring that the material transfer vehicle follows the roadway to be paved, the operator would also have to keep an eye on the track followed by the paving machine, while also watching for delivery trucks carrying asphalt paving material, ordinary traffic movement, and people (including paving personnel) who might walk in the roadway. It is also not clear how such a system would operate when the material transfer vehicle is moved to engage a delivery truck in order to receive a load of paving material.

It would be desirable if an auto-tracking method and apparatus for a material transfer vehicle that is supplying a paving machine could be developed that would not require the installation of any components of the auto-tracking apparatus on the paving machine, so that the material transfer vehicle with the auto-tracking system could be employed with any conventional paving machine. It would also be desirable if such a method and apparatus could be provided that would be relatively easy and inexpensive to retrofit on a conventional material transfer vehicle. It would furthermore be desirable if such a method and apparatus could be developed that would not require the installation of sensor targets on any machine, or the installation of sensors on the discharge end of the paver-loading conveyor.

ADVANTAGES OF THE INVENTION

Among the advantages of the invention is that it provides a method and apparatus for automatically controlling the speed and braking of a material transfer vehicle with respect to an asphalt paving machine that is being supplied by the material transfer vehicle. Still another advantage of the invention is that it provides such a method and apparatus without requiring the installation of auto-tracking components on both the material transfer vehicle and the paving machine. Yet another advantage of the invention is that it is relatively easy and inexpensive to retrofit on a conventional material transfer vehicle. Still other advantages of the invention are that it does not require the installation of sensor targets on any machine, or the installation of sensors on the discharge end of the paver-loading conveyor, or the installation of any components on the paving machine. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing"

are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The terms "operatively connected" and "operatively attached" describe such attachments, couplings or connections that allow the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The terms "asphalt paving material" and "paving material" refer to a bituminous paving mixture that is comprised of asphalt binder and any of various aggregate materials, and which is used for paving purposes.

The terms "asphalt paving machine", "paving machine" and "paver" refer to a finishing machine for applying asphalt paving material to form an asphalt mat on a roadway, parking lot or similar surface. An asphalt paving machine is typically a self-propelled vehicle having a hopper at one end for receiving asphalt material and a floating screed at the other end for forming an asphalt mat.

The term "asphalt mat" refers to a layer of asphalt paving material that is applied by an asphalt paving machine to produce a roadway, parking lot or similar surface.

The term "material transfer vehicle" refers to a vehicle that is adapted to receive a load of asphalt paving material from a delivery truck and to transfer the paving material into the hopper of an asphalt paving machine. A material transfer vehicle includes a truck-receiving hopper that is adapted to receive asphalt material from a delivery truck, and a paver-loading conveyor that is adapted to discharge asphalt material into the hopper of an asphalt paving machine.

The term "front end" and similar terms, when used in connection with a material transfer vehicle or a component or portion of such a vehicle, refer to the end of the vehicle, or the component or portion thereof, which is in the direction of travel of the vehicle while it is unloading asphalt paving material into the paving machine. The term "front end" and similar terms, when used in connection with a paving machine or a component or portion of such a machine, refer to the end of the machine or the component or portion thereof, which is in the direction of travel of the paving machine while it is carrying out a paving operation.

The terms "forward", "in front of", and similar terms, as used herein to describe a relative position or direction on or in connection with a material transfer vehicle or a paving machine, or a component or portion of such a vehicle or machine, refer to a relative position or direction towards the front end of the vehicle or machine.

The terms "back end", "rear end" and similar terms, when used in connection with a material transfer vehicle or a component or portion of such a vehicle, refer to the end of the vehicle, or the component or portion thereof, which is farther from the front end of the vehicle. The terms "back end", "rear end" and similar terms, when used in connection with a paving machine or a component or portion of such a machine, refer to the end of the machine or the component or portion thereof, which is farther from the front end of the paving machine.

The terms "rearward", "behind", and similar terms, as used herein to describe a relative position or direction on or in connection with a material transfer vehicle or a paving machine, or a component or portion of such a vehicle or machine, refer to a relative position or direction towards the rear end of the vehicle or machine.

SUMMARY OF THE INVENTION

The invention comprises a method and apparatus for controlling the spacing between a material transfer vehicle that is being steered by a driver/operator and an operator-controlled paving machine that is being supplied by the material transfer vehicle. The apparatus includes no components that are mounted to the paving machine. Instead, the apparatus includes only a controller and a sensor, both of which are mounted on the material transfer vehicle. The controller is operatively connected to a propulsion control mechanism for controlling the speed of the material transfer vehicle and a braking control mechanism for controlling the braking of the material transfer vehicle. The controller is adapted to send signals to these control mechanisms to control the speed and braking of the material transfer vehicle. The sensor is mounted on the material transfer vehicle in a location that allows it to execute non-contact sensor scans across the front of the paving machine to obtain feedback information about the distance from the sensor to the various components and surfaces on the front of the paving machine. The sensor is operatively connected to the controller and adapted to communicate information to the controller about the distance from the sensor to the various components and surfaces on the front of the paving machine.

When it is desired to begin the paving operation, the driver/operator of the material transfer vehicle will position the vehicle in a location with a predetermined desired spacing from the paving machine. The driver/operator of the material transfer vehicle will activate the sensor to calibrate the apparatus by emitting non-contact light pulse scans across the front of the paving machine. The distances measured by the sensor will be stored in the controller's memory as baseline points. When the paving machine begins paving operations, the sensor will continuously scan the front of the paving machine and the controller will compare the instantaneous readings obtained with the baseline points stored in the controller's memory. The controller will automatically communicate with the control mechanisms for propulsion and braking of the material transfer vehicle and will cause these control mechanisms to maintain the predetermined baseline distance and location with respect to the paving machine. A preferred embodiment of the invention includes status lights on the material transfer vehicle that are operatively connected to the controller and adapted to alert the driver/operator of the material transfer vehicle, the driver/operator of the paving machine and other members of the paving crew if the material transfer vehicle is or is not in the desired location.

In order to facilitate an understanding of the invention, the preferred embodiments of the invention, as well as the best mode known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and wherein.

DESCRIPTION OF THE PREFERRED EMBODIMENTS OF THE INVENTION

Figure 1:
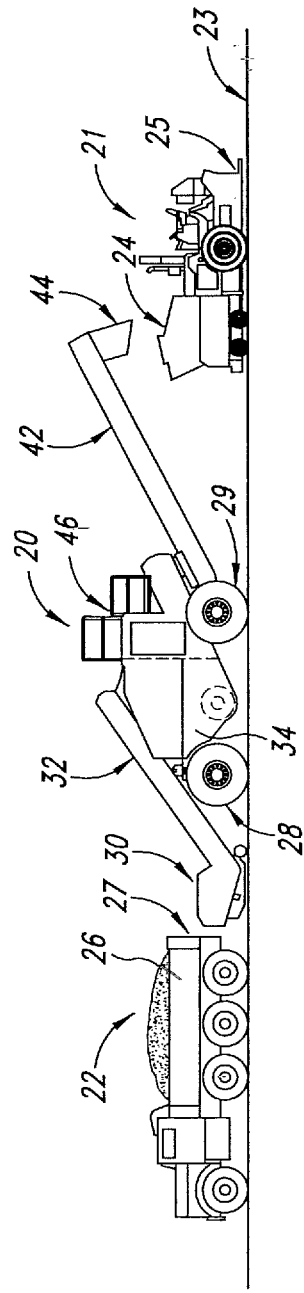
FIG. 1 is a side view of a conventional material transfer vehicle in association with an asphalt supply truck and an asphalt paving machine.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, a conventional self-propelled material transfer vehicle 20 is positioned adjacent to and between conventional asphalt paving machine 21 and conventional asphalt paving material delivery truck 22. Paving machine 21 may be operated to install an asphalt mat on roadway 23 as it moves in a direction from right to left, as shown in FIG. 1. Paving machine 21 includes hopper 24 at its front end and floating screed 25 at its rear end. Paving machine 21 also includes a conventional conveyor system comprising longitudinally disposed conveyors (not shown) and a transversely disposed screw auger (also not shown) for delivering the asphalt paving material from hopper 24 to a position just in advance of screed 25 where it is discharged onto the surface to be paved.

Conventional delivery truck 22 includes a pivotally mounted bed 26 with a tailgate 27, and is adapted to deliver asphalt paving material from a remote source to material transfer vehicle 20. Preferably, the delivery truck delivers the asphalt paving material to the material transfer vehicle at a convenient location remote from the paving machine, and then the material transfer vehicle transports the asphalt paving material to the paving location for discharge into paving machine hopper 24. Thus, material transfer vehicle 20 is adapted to shuttle between asphalt paving material delivery trucks at a paving material-receiving location and a paving machine that is engaged in paving a roadway.

Figure 3:
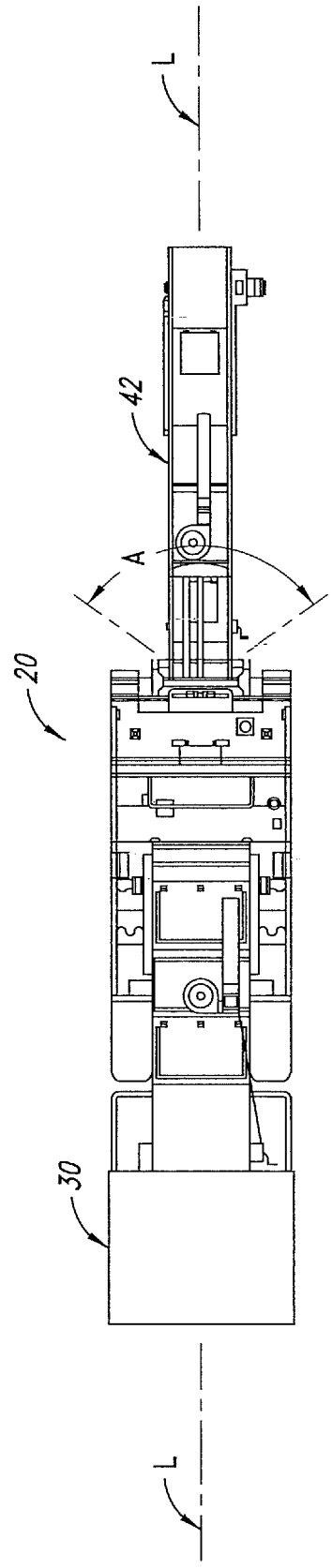
FIG. 3 is a top view of the material transfer vehicle shown in FIGS. 1 and 2.
Figure 2:
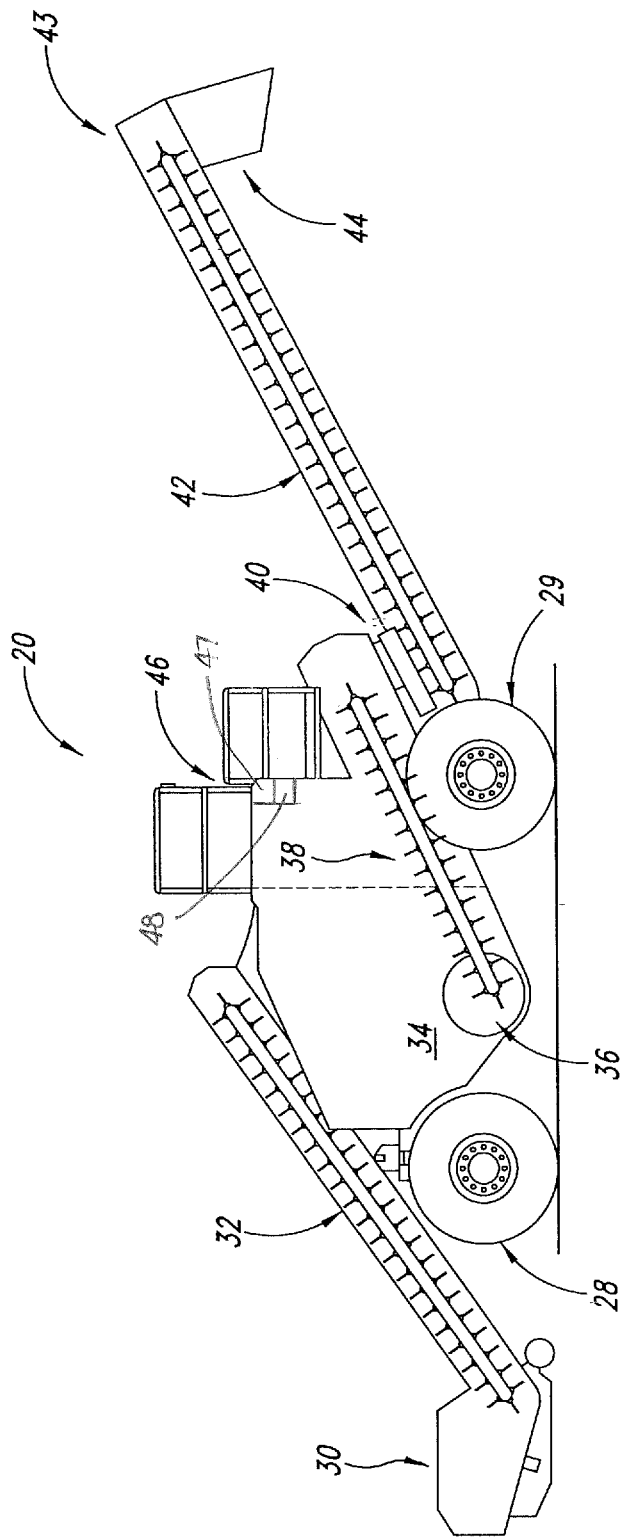
FIG. 2 is a partial sectional view of the material transfer vehicle shown in FIG. 1.

Material transfer vehicle 20 includes a frame that is supported on the roadway surface by first wheel set 28 and second wheel set 29. Each of the wheel sets is driven by a hydraulic motor (not shown) that is supplied with fluid under pressure by one or more hydraulic pumps (also not shown). Vehicle 20 includes truck-receiving hopper 30 and truck-unloading conveyor 32 for receiving asphalt paving material from delivery truck 22 and for conveying it to surge bin 34. The surge bin includes transverse auger 36 that is employed to mix the asphalt paving material in the surge bin in order to minimize segregation or separation of the aggregate portion of the asphalt paving material by size. Also located in the surge bin is surge conveyor 38, which is adapted to convey asphalt paving material out of the surge bin to chute 40 which is associated with paver-loading conveyor 42. Asphalt paving material conveyed out of the surge bin by conveyor 38 falls through chute 40 and onto paver-loading conveyor 42. Paver-loading conveyor 42 is mounted for vertical pivotal movement about a pivot at its entry end as raised and lowered by a linear actuator (not shown). Conveyor 42 is also adapted for side-to-side movement about a vertical axis (perpendicular to the plane of the paper on which FIG. 3 is shown) with respect to longitudinal axis "L" through an angular range "A" by operation of one or more additional actuators (also not shown). Asphalt paving material that falls through chute 40 onto paver-loading conveyor 42 is discharged through chute 44 into hopper 24 of paving machine 21. Hydraulic drive systems including hydraulic pumps and hydraulic motors are provided to drive transverse auger 36 and the various conveyors, and an engine (not shown) provides the motive force for the hydraulic pumps that drive the hydraulic motors for the wheel sets, the transverse auger and the various conveyors and other components of the vehicle. Vehicle 20 is operated by a driver/operator located at operator station 46. Propulsion control mechanism 47 is operatively attached to the hydraulic drive systems and/or the engine for controlling the speed of the material transfer vehicle, and braking control mechanism 48 is operatively connected to the conventional braking system for wheel sets 28 and 29.

Figure 4:
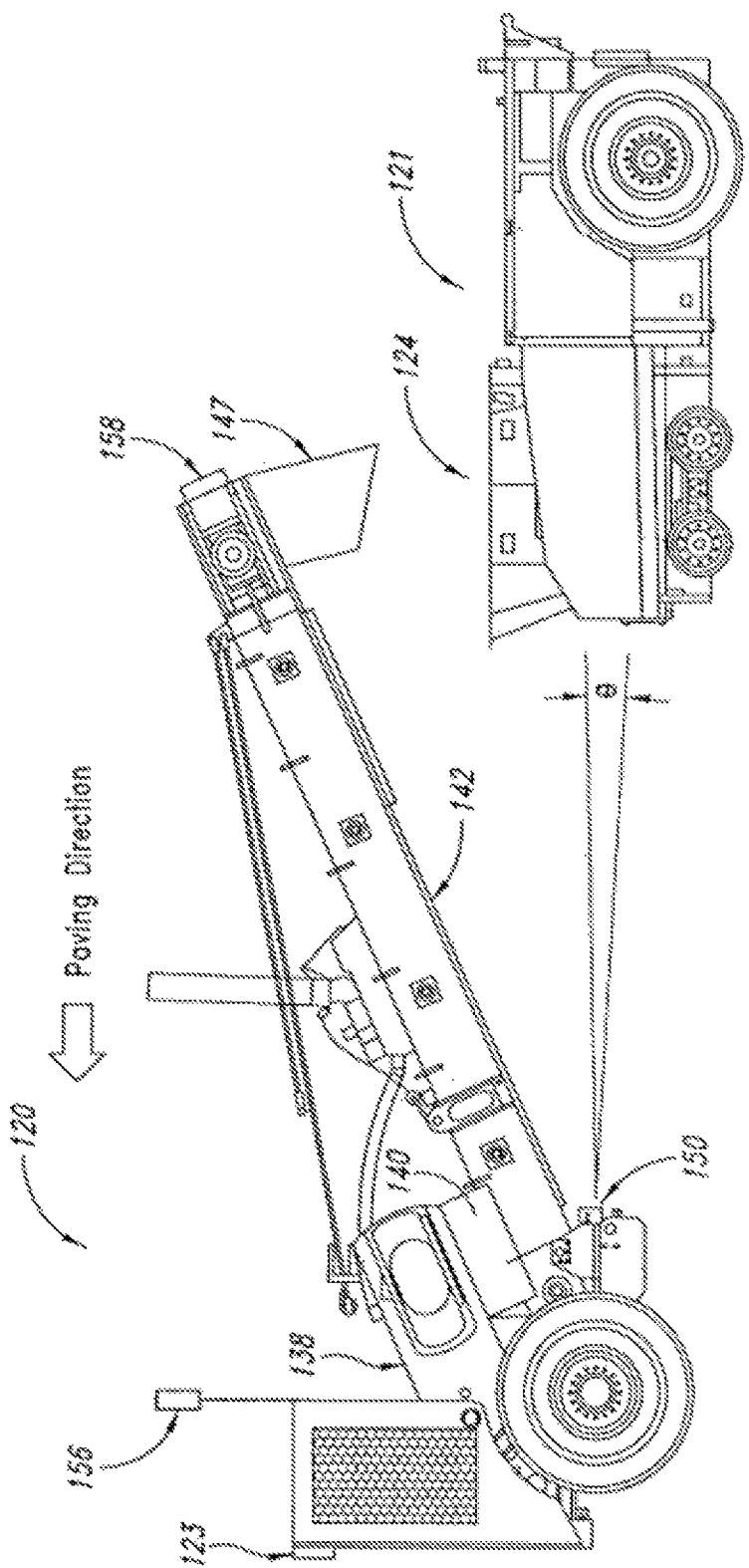
FIG. 4 is a side view of a portion of a material transfer vehicle that is equipped with a first embodiment of the invention comprising a first embodiment of the sensor that is located in a first position and includes a pair of status light assemblies, and a portion of a paving machine that is placed so as to be supplied by the material transfer vehicle.
Figure 5:
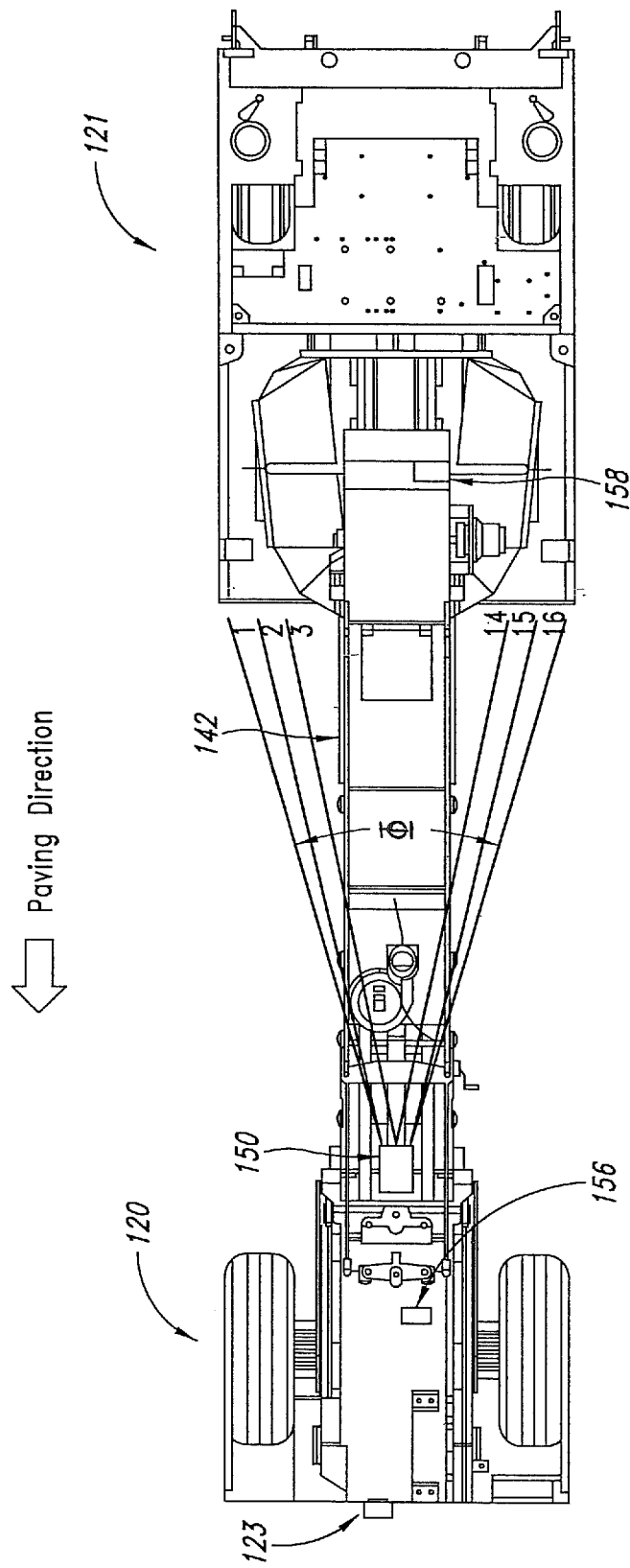
FIG. 5 is a top view of the portion of the material transfer vehicle and the portion of the paving machine illustrated in FIG. 4; however, the portion of the discharge conveyor in the vicinity of the sensor on the bottom of the discharge conveyor is not shown in order to reveal the location of the sensor.

A portion of a material transfer vehicle that is adapted to supply asphalt paving material to a paving machine according to a first embodiment of the invention is shown in FIGS. 4 and 5. This embodiment of the invention locates the sensor in a first location and includes a pair of status light assemblies 156 and 158 (described in more detail hereinafter). As shown in these drawings, material transfer vehicle 120 is substantially similar to material transfer vehicle 20. It includes surge conveyor 138, which is adapted to convey asphalt paving material out of the surge bin (not shown) to chute 140 which is associated with paver-loading conveyor 142. Asphalt paving material conveyed out of the surge bin by conveyor 138 falls through chute 140 and onto paver-loading conveyor 142. Paver-loading conveyor 142 is mounted for vertical pivotal movement about a pivot at its entry end as raised and lowered by a linear actuator (not shown). Conveyor 142 is also adapted for side-to-side movement about a vertical axis (perpendicular to the plane of the paper on which FIG. 5 is shown) by operation of one or more additional actuators (also not shown). Asphalt paving material that falls through chute 140 onto paver-loading conveyor 142 is discharged through chute 147 into hopper 124 at the front end of paving machine 121. Conventional paving machine 121 also includes a floating screed (not shown) at its rear end, and a conventional conveyor system comprising longitudinally disposed conveyors (not shown) and a transversely disposed screw auger (also not shown) for delivering the asphalt paving material from hopper 124 to a position just in advance of the screed where it is discharged onto the surface to be paved.

Material transfer vehicle 120 also includes an operator's platform (not shown, but substantially the same as operator's platform 46 of vehicle 20) on which is mounted controller 123. Controller 123 is operatively connected to a propulsion control mechanism (not shown, but substantially similar to propulsion control mechanism 47) and a braking control mechanism (not shown but substantially similar to braking control mechanism 48). Controller 123 may embody a single microprocessor or multiple microprocessors that include components (including the control mechanisms for propulsion and braking) for controlling the operations of the material transfer vehicle based on input from a driver/operator of the vehicle and on sensed or other known operational parameters. Controller 123 may include or be associated with a memory, a data input component such as a touch screen and/or a plurality of actuating buttons, a data output component such as a display screen, a secondary storage device, a processor and other components for running an application. Various circuits may be associated with and operatively connected to the controller, such as power supply circuitry and hydraulic circuitry. Numerous commercially available microprocessors can be configured to perform the functions of controller 123. It should be appreciated that controller 123 could be part of, or operatively connected to, a general purpose computer or machine microprocessor capable of controlling numerous functions of the material transfer vehicle.

Preferably, the sensor is located below the paver-loading conveyor of the material transfer vehicle. Thus, sensor 150 is mounted to the frame of material transfer vehicle 120 beneath paver-loading conveyor 142, and is operatively connected to controller 123. Sensor 150 is adapted to execute a plurality of non-contact sensor scan passes across the front of paving machine 121. In this embodiment of the invention, sensor 150 is an IS16 Industrial Leddar™ sensor that is supplied by LeddarTech, Inc. of Quebec City, Canada. This sensor emits LED light in either the visible or the infrared spectrum, preferably within a predetermined vertical angular range $\theta$ of preferably about 6°, as shown in FIG. 4, and a predetermined horizontal angular range $\Phi$ of preferably about 48°, as shown in FIG. 5. The IS16 Industrial Leddar™ sensor employs 16 discrete light pulse emissions per scan, each at a different angle within vertical angular range $\theta$ and/or horizontal angular range $\Phi$, across the front end of paving machine 121. In other words, the IS16 Industrial Leddar™ sensor is adapted to emit a plurality of discrete light pulse emissions in each scan pass, and each such light pulse emission in a scan pass is directed towards the front end of the paving machine at a different angle within a predetermined vertical angular range and/or a predetermined horizontal angular range from that of each other light pulse emission in the scan pass.

A multi-channel photodetector array collects the backscatter of the emitted light and measures the time taken for the emitted light to be reflected off of the paving machine and return to the sensor. The Leddar™ sensor receives those reflected light pulses at roughly 20 pulses per second. The Leddar™ sensor employs a time-of-flight algorithm that produces a horizontal distance and amplitude measurement for each of the 16 light pulse transmissions per scan, and it is adapted to communicate this distance information to controller 123. From this information, the distance to various features on the front end of paving machine 121 can be calculated.

Figure 6:
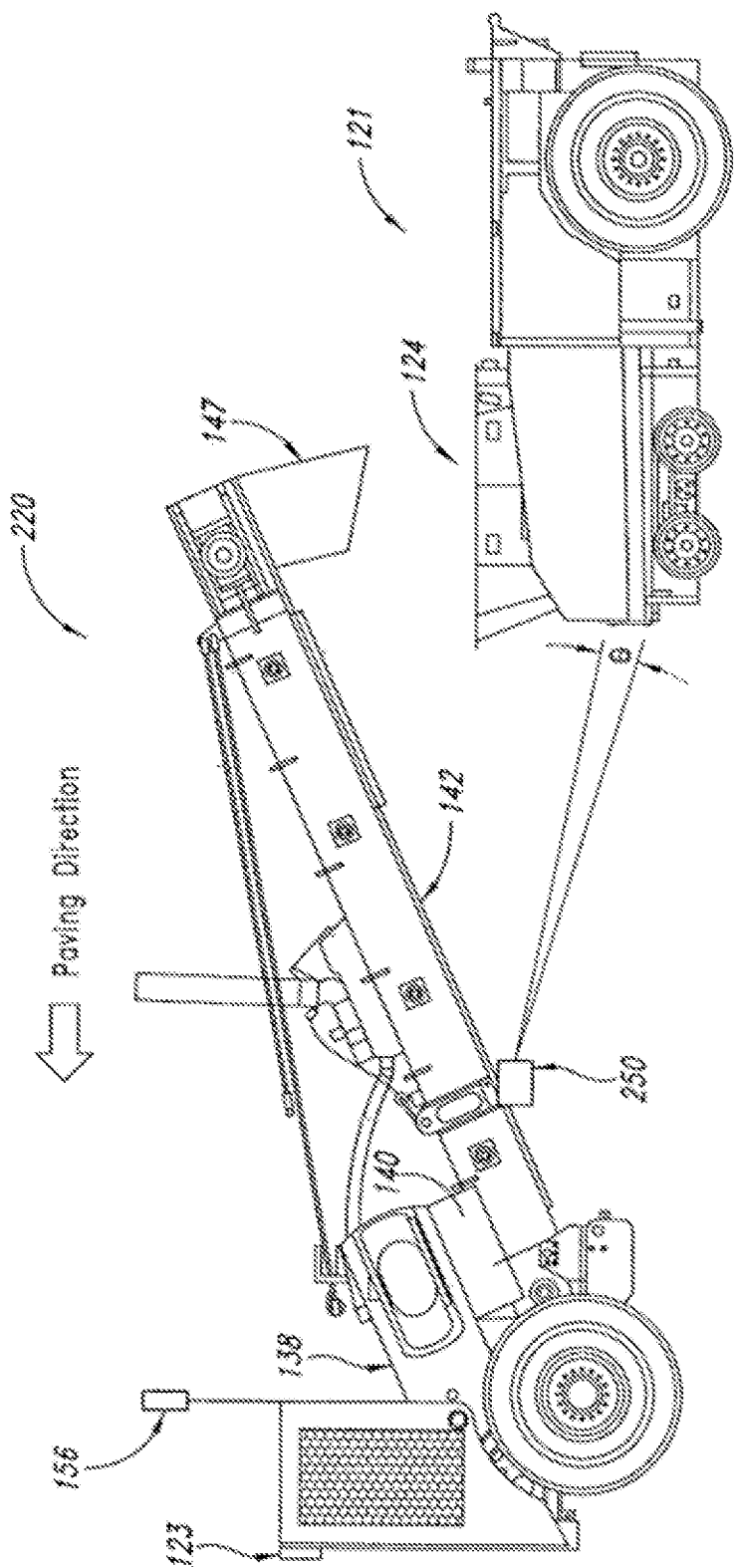
FIG. 6 is a side view of a portion of a material transfer vehicle that is equipped with a second embodiment of the invention comprising the first embodiment of the sensor that is located in a second position and includes a single status light assembly, and a portion of a paving machine that is placed so as to be supplied by the material transfer vehicle.
Figure 7:
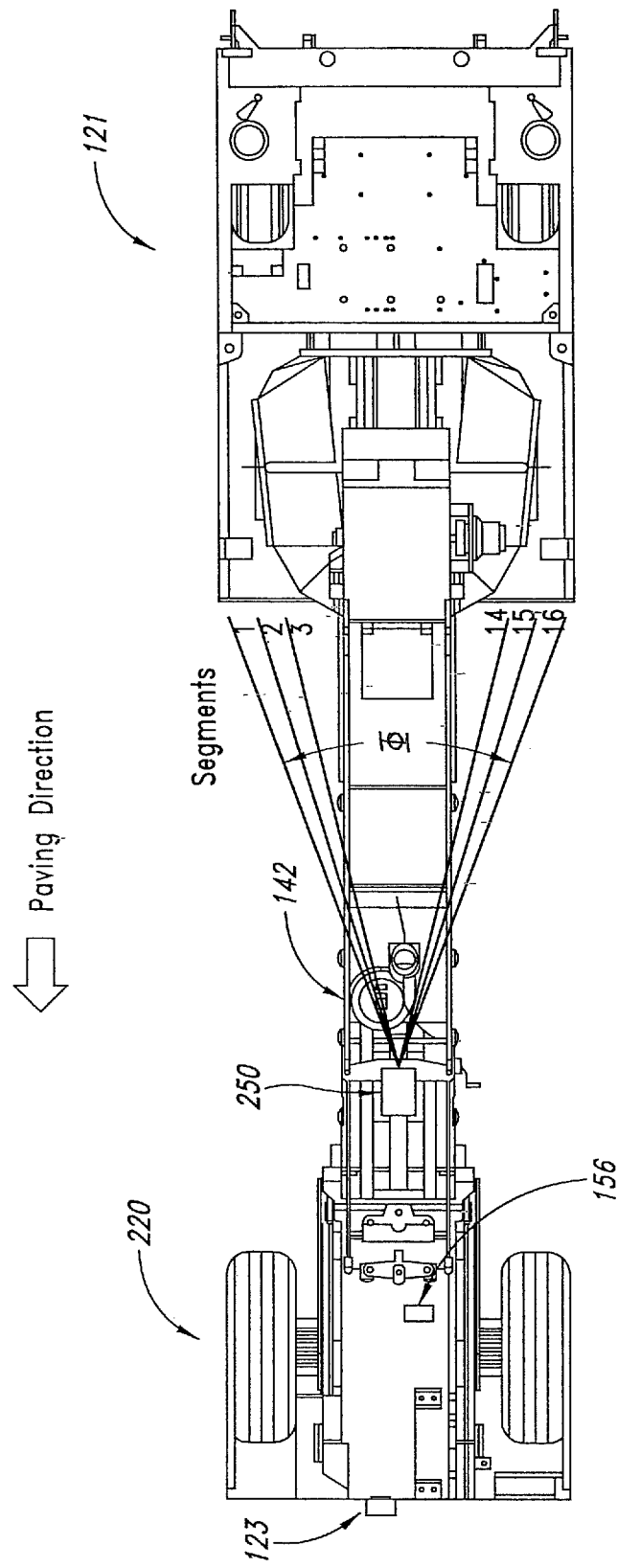
FIG. 7 is a top view of the portion of the material transfer vehicle and the portion of the paving machine illustrated in FIG. 6; however, the portion of the discharge conveyor in the vicinity of the sensor on the bottom of the discharge conveyor is not shown in order to reveal the location of the sensor.

A portion of a material transfer vehicle that is adapted to supply asphalt paving material to a paving machine according to a second embodiment of the invention is shown in FIGS. 6 and 7. This embodiment of the invention locates a sensor such as a Leddar™ sensor in a second location and includes only a single status light assembly 156. As shown in these drawings, material transfer vehicle 220 is substantially similar to material transfer vehicle 20 and to material transfer vehicle 120. It includes surge conveyor 138, which is adapted to convey asphalt paving material out of the surge bin (not shown) to chute 140 which is associated with paver-loading conveyor 142. Asphalt paving material conveyed out of the surge bin by conveyor 138 falls through chute 140 and onto paver-loading conveyor 142. Paver-loading conveyor 142 is mounted for vertical pivotal movement about a pivot at its entry end as raised and lowered by a linear actuator (not shown). Conveyor 142 is also adapted for side-to-side movement about a vertical axis (perpendicular to the plane of the paper on which FIG. 7 is shown) by operation of one or more additional actuators (also not shown). Asphalt paving material that falls through chute 140 onto paver-loading conveyor 142 is discharged through chute 147 into hopper 124 at the front end of paving machine 121.

Material transfer vehicle 220 also includes controller 123, and sensor 250 which is mounted on the lower side of paver-loading conveyor 142. Sensor 250 is operatively connected to controller 123, and except for its location, is otherwise identical to sensor 150. Controller 123 is also operatively connected to a propulsion control mechanism (not shown, but substantially similar to propulsion control mechanism 47) and a braking control mechanism (not shown but substantially similar to braking control mechanism 48).

Sensor 250 is adapted to execute a plurality of non-contact sensor scan passes, employing 16 discrete light pulse emissions per scan, each at a different angle within predetermined vertical angular range $\theta$ and/or predetermined horizontal angular range $\Phi$, across the front of paving machine 121. A multi-channel photodetector array collects the backscatter of the emitted light and measures the time taken for the emitted light to be reflected off of the paving machine and return to the sensor. From this information, the distance to various features on the front end of paving machine 121 can be calculated.

Figure 8:
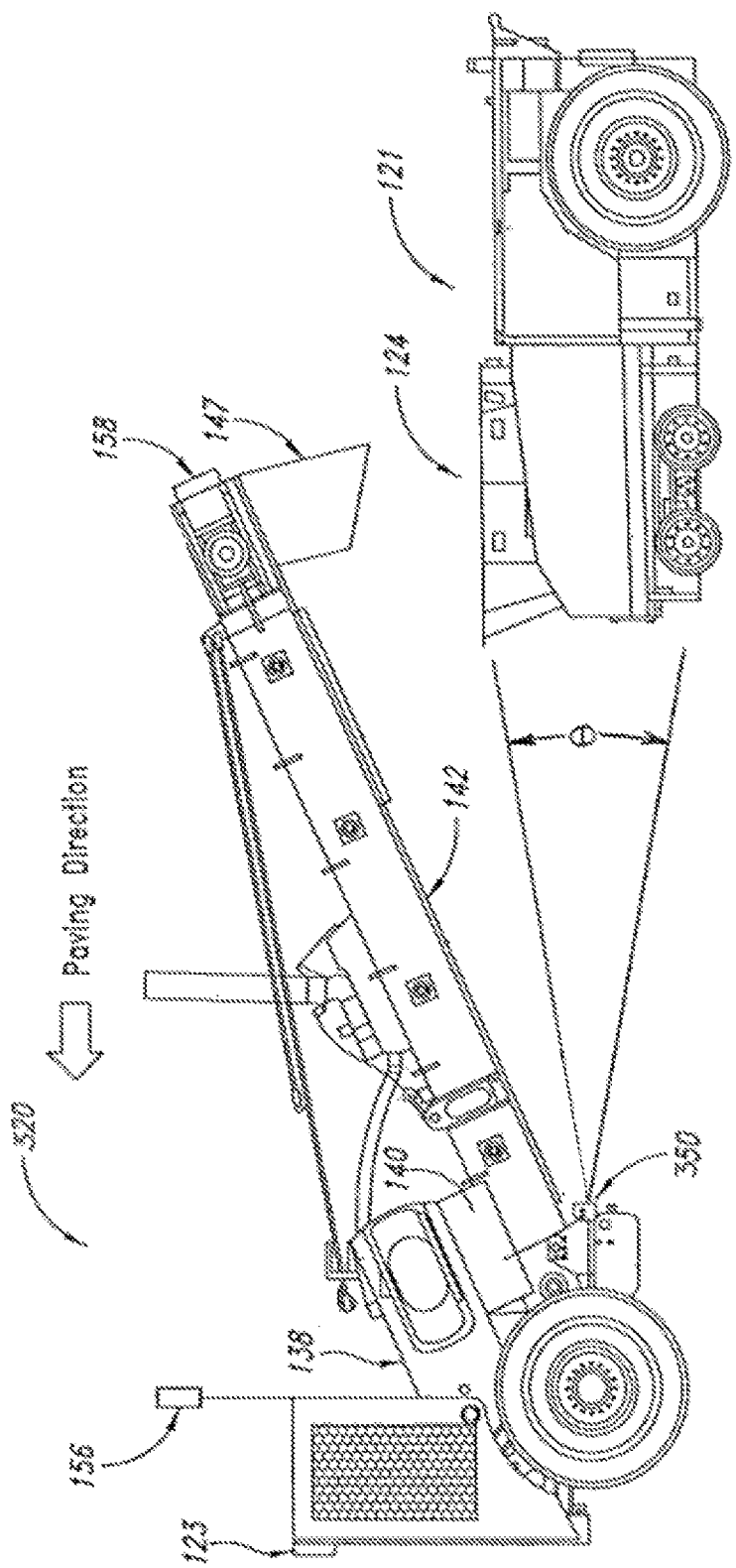
FIG. 8 is a side view of a portion of a material transfer vehicle that is equipped with a third embodiment of the invention comprising a second embodiment of the sensor that is located in a first position and includes a pair of status light assemblies, and a portion of a paving machine that is placed so as to be supplied by the material transfer vehicle.
Figure 9:
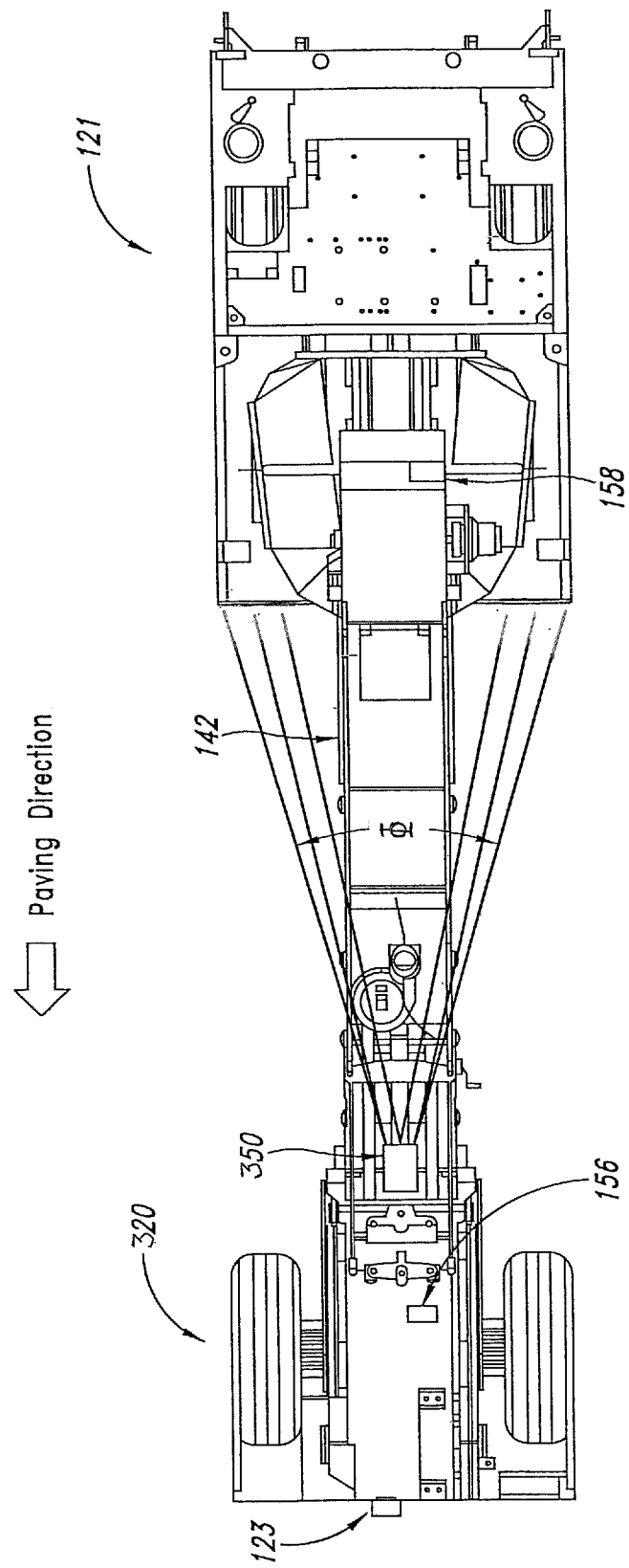
FIG. 9 is a top view of the portion of the material transfer vehicle and the portion of the paving machine illustrated in FIG. 8; however, the portion of the discharge conveyor in the vicinity of the sensor on the bottom of the discharge conveyor is not shown in order to reveal the location of the sensor.

A portion of a material transfer vehicle that is adapted to supply asphalt paving material to a paving machine according to a third embodiment of the invention is shown in FIGS. 8 and 9. As shown in these drawings, material transfer vehicle 320 is substantially similar to material transfer vehicle 20, material transfer vehicle 120 and material transfer vehicle 220. This embodiment of the invention includes a pair of status light assemblies 156 and 158 (described in more detail hereinafter), similar to the embodiment shown in FIGS. 4 and 5.

Material transfer vehicle 320 includes surge conveyor 138, which is adapted to convey asphalt paving material out of the surge bin (not shown) to chute 140 which is associated with paver-loading conveyor 142. Asphalt paving material conveyed out of the surge bin by conveyor 138 falls through chute 140 and onto paver-loading conveyor 142. Paver-loading conveyor 142 is mounted for vertical pivotal movement about a pivot at its entry end as raised and lowered by a linear actuator (not shown). Conveyor 142 is also adapted for side-to-side movement about a vertical axis (perpendicular to the plane of the paper on which FIG. 9 is shown) by operation of one or more additional actuators (also not shown). Asphalt paving material that falls through chute 140 onto paver-loading conveyor 142 is discharged through chute 147 into hopper 124 at the front end of paving machine 121. Material transfer vehicle 320 also includes controller 123, and sensor 350 which is mounted on the lower side of paver-loading conveyor 142. Controller 123 is also operatively connected to a propulsion control mechanism (not shown, but substantially similar to propulsion control mechanism 47) and a braking control mechanism (not shown but substantially similar to braking control mechanism 48).

Sensor 350 is operatively connected to controller 123, and is adapted to execute a plurality of non-contact sensor scan passes across the front of paving machine 121. Preferably, sensor 350 is an O3M 3D Smart™ sensor that is supplied by IFM Electronic (Ireland) Ltd. of Dublin, Ireland. This sensor uses photonic mixing device (PMD) time-of-flight technology to create 3D imaging and distance monitoring. The O3M 3D Smart™ sensor includes an infrared light emission unit that transmits infrared light in a continuous series of signals towards paving machine 121, and uses the phase shift of light reflected from the surfaces of the paving machine to determine the distance from the sensor to the paving machine. One version of O3M 3D Smart™ sensor includes an emission unit that transmits light within a predetermined vertical angular range $\theta$ that is about 23°, as shown in FIG. 8, and a predetermined horizontal angular range $\Phi$ that is about 70°, as shown in FIG. 9. Another version of the O3M 3D Smart™ sensor includes an emission unit that transmits light within a predetermined vertical angular range $\theta$ that is about 32° and a predetermined horizontal angular range $\Phi$ that is about 95°. It is also contemplated within the scope of the invention that sensors may be employed that emit light within predetermined horizontal and vertical angular ranges that are different from those obtained by use of a Leddar™ sensor or an O3M 3D Smart™ sensor.

The O3M 3D Smart™ sensor employs 1024 discrete light pulse emissions per scan across the front end of paving machine 121, each at a different angle within vertical angular range $\theta$ and/or horizontal angular range $\Phi$. In other words, the O3M 3D Smart™ sensor is adapted to emit a plurality of discrete light pulse emissions in each scan pass, and each such light pulse emission in a scan pass is directed towards the front end of the paving machine at a different angle within a predetermined vertical angular range and/or a predetermined horizontal angular range from that of each other light pulse emission in the scan pass. A light receiving unit on the O3M 3D Smart™ sensor receives those reflected light pulses at roughly 50 pulses per second, and a photonic mixing device determines the time taken for the transmitted light to be reflected off of the paving machine and return to the sensor, and sensor 350 is adapted to communicate this distance information to controller 123. From this information, the distance to various features on the front end of paving machine 121 can be calculated.

Figure 10:
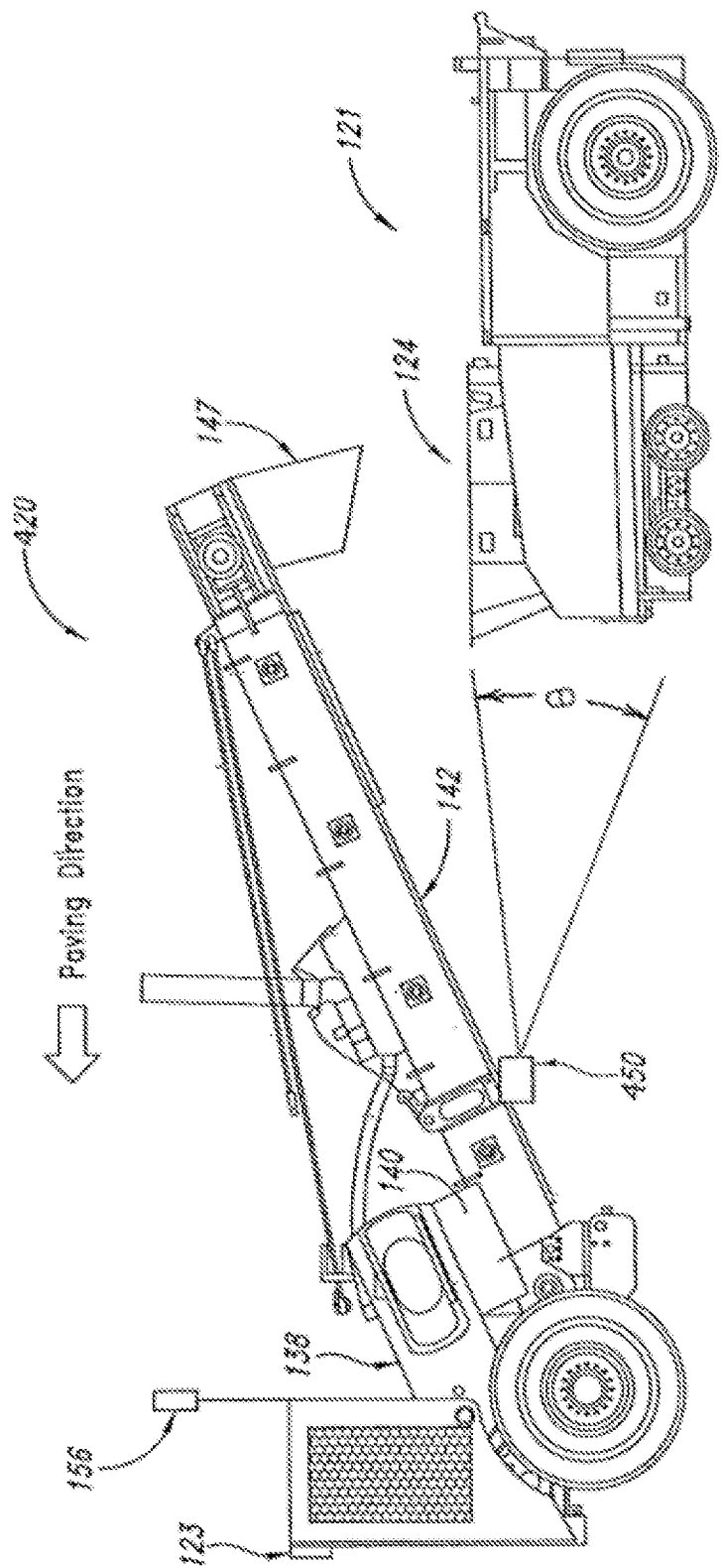
FIG. 10 is a side view of a portion of a material transfer vehicle that is equipped with a fourth embodiment of the invention comprising the second embodiment of the sensor that is located in a second position and includes a single status light assembly, and a portion of a paving machine that is placed so as to be supplied by the material transfer vehicle.
Figure 11:
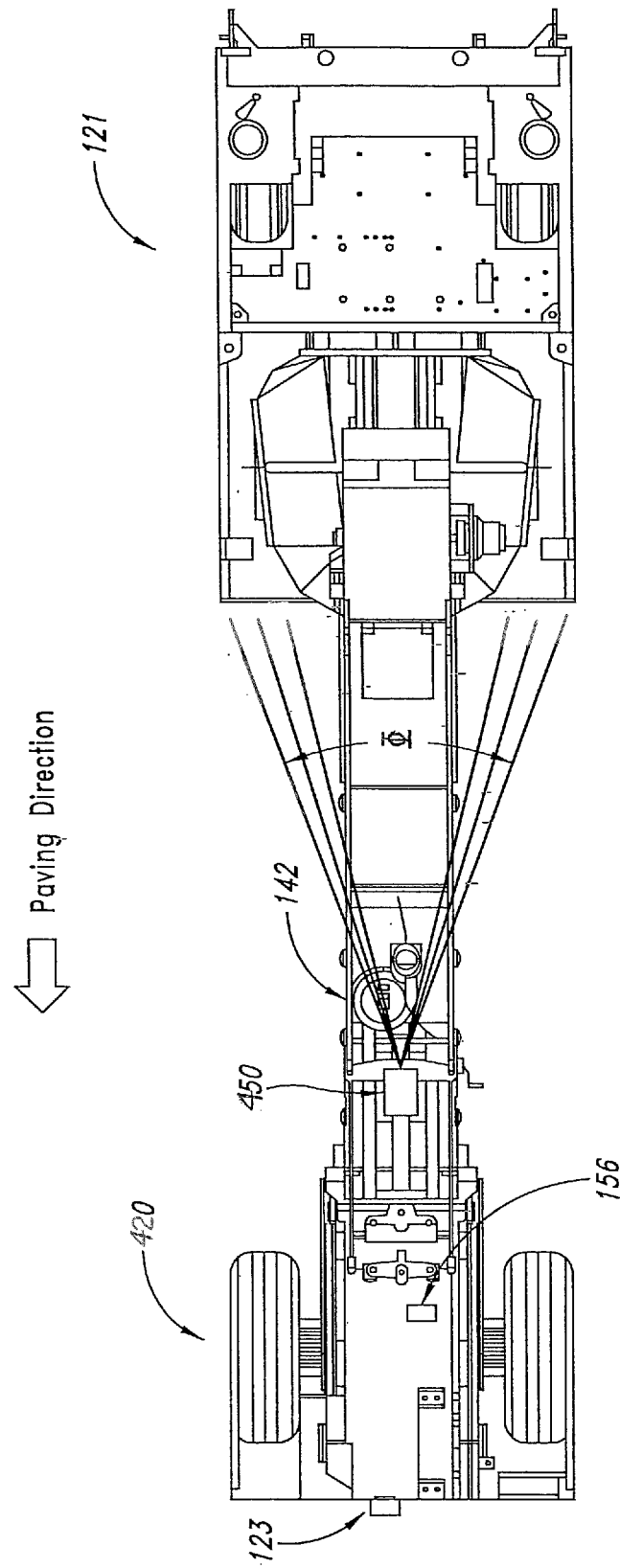
FIG. 11 is a top view of the portion of the material transfer vehicle and the portion of the paving machine illustrated in FIG. 10; however, the portion of the discharge conveyor in the vicinity of the sensor on the bottom of the discharge conveyor is not shown in order to reveal the location of the sensor.

A portion of a material transfer vehicle that is adapted to supply asphalt paving material to a paving machine according to a fourth embodiment of the invention is shown in FIGS. 10 and 11. As shown in these drawings, material transfer vehicle 420 is substantially similar to material transfer vehicle 20, material transfer vehicle 120, material transfer vehicle 220 and material transfer vehicle 320. It includes surge conveyor 138, which is adapted to convey asphalt paving material out of the surge bin (not shown) to chute 140 which is associated with paver-loading conveyor 142. Asphalt paving material conveyed out of the surge bin by conveyor 138 falls through chute 140 and onto paver-loading conveyor 142. Paver-loading conveyor 142 is mounted for vertical pivotal movement about a pivot at its entry end as raised and lowered by a linear actuator (not shown). Conveyor 142 is also adapted for side-to-side movement about a vertical axis (perpendicular to the plane of the paper on which FIG. 11 is shown) by operation of one or more additional actuators (also not shown). Asphalt paving material that falls through chute 140 onto paver-loading conveyor 142 is discharged through chute 147 into hopper 124 at the front end of paving machine 121.

Material transfer vehicle 420 also includes controller 123, and sensor 450 which is mounted on the lower side of paver-loading conveyor 142. Sensor 450 is operatively connected to controller 123, and except for its location, is otherwise identical to sensor 350. Controller 123 is also operatively connected to a propulsion control mechanism (not shown, but substantially similar to propulsion control mechanism 47) and a braking control mechanism (not shown but substantially similar to braking control mechanism 48). This embodiment of the invention locates sensor 450 in a different location from that shown in FIGS. 8 and 9, and it includes a single status light assembly 156. Sensor 450 is adapted to execute a plurality of non-contact sensor scan passes across the front of paving machine 121, and to use the phase shift of light reflected from the surfaces of the paving machine to determine the distance from the sensor to the front end of paving machine 121.

When it is desired to begin the paving operation, the operator of material transfer vehicle 120, material transfer vehicle 220, material transfer vehicle 320 or material transfer vehicle 420 will position the vehicle in a location with a predetermined desired spacing from paving machine 121. The operator will activate sensor 150, sensor 250, sensor 350 or sensor 450, as applicable, to calibrate the system by executing a scan pass comprising the emission of light at a plurality of different angular locations across the front end of the paving machine. The controller will store the distances measured by the plurality of scans in the controller's memory as baseline points that indicate a predetermined baseline distance from the sensor to the various features on the front end of the paving machine. When paving machine 121 begins paving operations, the sensor will continuously scan the front end of the paving machine and the controller will compare the instantaneous readings obtained with the baseline points stored in the controller's memory.

Controller 123 will automatically communicate with the propulsion control mechanism and the braking control mechanism for the material transfer vehicle and will cause these mechanisms to maintain the predetermined baseline distance with respect to the paving machine during the paving operation. As the sensor continues to scan the front of the paving machine during paving, it is possible that smoke or paving workers may interrupt some of the scans of the sensor across the front of the paving machine. However, by providing multiple discrete light emissions in each pass, each at a different angle within horizontal angular range $\Phi$, the sensor is able to locate the paving machine so that the controller may properly locate the material transfer vehicle with respect thereto even if some of the scans are interrupted.

Figure 12:
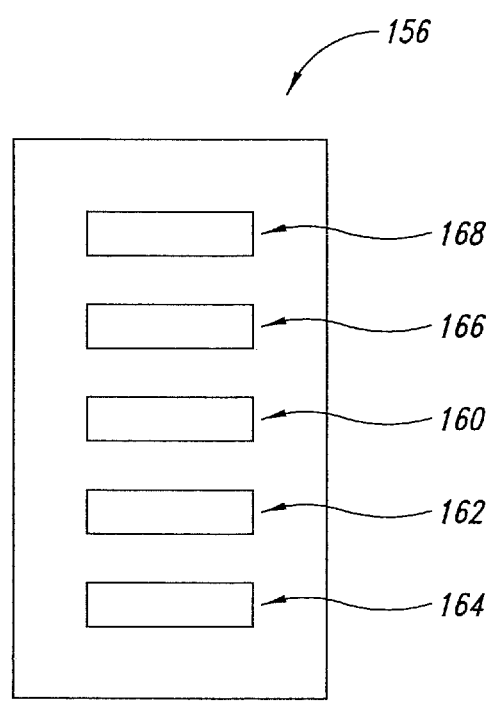
FIG. 12 is a front view of a status light assembly of a preferred embodiment of the invention.

Status light assemblies 156 and 158 on material transfer vehicles 120 and material transfer vehicle 320, or status light assembly 156 on material transfer vehicle 220 and material transfer vehicle 420, are operatively connected to controller 123 so that the controller may selectively illuminate the status lights on each status light assembly to alert the operator of the material transfer vehicle, the driver/operator of the paving machine and other members of the paving crew if the material transfer vehicle is or is not at the predetermined baseline distance from the paving machine. FIG. 12 illustrates a preferred embodiment of the various lights on status light assembly 156, which is essentially identical to status light assembly 158. In the embodiment of FIGS. 4 and 5 and the embodiment of FIGS. 8 and 9, each of which includes a pair of status light assemblies, status light assemblies 156 and 158 are coordinated so that the controller will illuminate each corresponding light on each assembly at the same time. Controller 123 is adapted to send signals to illuminate the status lights on each status light assembly based upon the controller's determination of the location of the material transfer vehicle with respect to the paving machine. Thus, in a preferred embodiment of the invention, controller 123 will illuminate status lights 160, preferably green lights, on each light assembly when sensor 150, sensor 250, sensor 350 or sensor 450 has communicated to the controller that the material transfer vehicle is within a preselected window that includes the predetermined baseline distance from the paving machine. The controller will illuminate status lights 162, preferably yellow lights, when the material transfer vehicle is in the preselected window but drifting towards the paving machine, and will illuminate status lights 164, preferably red lights, when the material transfer vehicle is closer than the predetermined optimal distance from the paving machine. Similarly, controller 123 will illuminate status lights 166, preferably yellow lights, when the material transfer vehicle is within the preselected window, but drifting away from the paving machine, and will illuminate status lights 168, preferably red lights, when the material transfer vehicle is farther away from the predetermined optimal distance from the paving machine.

As described above, controller 123 is operatively connected to a propulsion control mechanism and a braking control mechanism for the material transfer vehicle. Controller 123 is adapted to transmit propulsion and braking signals to these mechanisms in order to control the speed and braking of material transfer vehicle 120, material transfer vehicle 220, material transfer vehicle 320 or material transfer vehicle 420, as applicable, in order to cause the material transfer vehicle to remain within a preselected window that includes a predetermined desired spacing from paving machine 121. Thus, the speed of the material transfer vehicle is tied to the movement of the paving machine. When the paving machine changes speeds, controller 123 will cause the material transfer vehicle to change its speed or to brake in order to remain within the preselected window that includes the predetermined desired spacing from the paving machine. If the sensor link between the material transfer vehicle and the paving machine is completely interrupted for any reason, so that the sensor is unable to locate the front end of the paving machine, a preferred embodiment of the controller will activate the braking control mechanism to bring the material transfer vehicle to a stop.

The invention thus provides a method and apparatus for automatically controlling the speed and braking of a material transfer vehicle with respect to an asphalt paving machine that is being supplied by the material transfer vehicle without requiring the installation of auto-tracking components on both the material transfer vehicle and the paving machine. Furthermore, the invention does not require the installation of sensor targets on any machine, the installation of any sensor system components on the paving machine, or the installation of sensors on the discharge end of the paver-loading conveyor.

Although this description contains many specifics, these should not be construed as limiting the scope of the invention but as merely providing illustrations of the presently preferred embodiments thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. An apparatus for controlling the movement of a material transfer vehicle with respect to the front end of a paving machine that is operated by a driver/operator and is being supplied with asphalt paving material by the material transfer vehicle, said apparatus comprising:
   (a) a controller that is mounted on the material transfer vehicle, said controller being operatively connected to:
      (i) a propulsion control mechanism for controlling the speed of the material transfer vehicle; and
      (ii) a braking control mechanism for controlling the braking of the material transfer vehicle;
   (b) a sensor that is mounted on the material transfer vehicle, said sensor being:
      (i) operatively connected to the controller;
      (ii) located and adapted to execute a plurality of non-contact sensor scan passes across the front end of the paving machine to determine the distance from the sensor to the paving machine, with each sensor scan pass employing a plurality of discrete light pulse emissions;
      (iii) adapted to communicate to the controller distance information from the sensor to the front end of the paving machine;
   wherein no components of the apparatus that are required by the apparatus in controlling movement of the material transfer vehicle with respect to the front of the paving machine are mounted on the paving machine.

2. The apparatus of claim 1 wherein the sensor is adapted to emit a plurality of discrete light pulse emissions in each scan pass, wherein each such light pulse emission is directed towards the front end of the paving machine at a different angle within a predetermined vertical angular range and/or a predetermined horizontal angular range from that of each other light pulse emission in the scan pass.

3. The apparatus of claim 2 wherein the sensor emits light within a predetermined vertical angular range towards the front of the paving machine, wherein such predetermined vertical angular range is about 6° to about 32°.

4. The apparatus of claim 2 wherein the sensor emits light within a predetermined horizontal angular range towards the front of the paving machine, wherein such predetermined horizontal angular range is about 48° to about 95°.

5. The apparatus of claim 1:
   (a) wherein the controller is adapted to determine a predetermined baseline distance of the material transfer vehicle from the paving machine;
   (b) which includes a status light assembly including a status light on the material transfer vehicle, said status light assembly being operatively connected to the controller;
   (c) wherein the controller is adapted to illuminate the status light if the material transfer vehicle is not at the predetermined baseline distance from the paving machine.

6. The apparatus of claim 1:
   (a) wherein the controller is adapted to determine a predetermined baseline distance of the material transfer vehicle from the paving machine;
   (b) which includes a status light assembly including a plurality of status lights on the material transfer vehicle, said status light assembly being operatively connected to the controller;
   (c) wherein the controller is adapted to illuminate a first status light on the status light assembly when the material transfer vehicle is within a preselected window that includes the predetermined baseline distance from the paving machine;
   (d) wherein the controller is adapted to illuminate a second status light on the status light assembly when the material transfer vehicle is in the preselected window but drifting towards the paving machine;
   (e) wherein the controller is adapted to illuminate a third status light on the status light assembly when the material transfer vehicle is closer than the predetermined baseline distance from the paving machine;
   (f) wherein the controller is adapted to illuminate a fourth status light on the status light assembly when the material transfer vehicle is within the preselected window, but drifting away from the paving machine;
   (g) wherein the controller is adapted to illuminate a fifth status light on the status light assembly when the material transfer vehicle is farther than the predetermined baseline distance away from the paving machine.

7. The apparatus of claim 1 wherein the controller is adapted to send signals to the propulsion control mechanism and the braking control mechanism of the material transfer vehicle to control the speed and braking of the material transfer vehicle.

8. The apparatus of claim 7 wherein the controller is adapted to cause the braking control mechanism to bring the material transfer vehicle to a halt if the sensor is unable to locate the front end of the paving machine.

9. The apparatus of claim 1 wherein:
   (a) the material transfer vehicle includes a paver-loading conveyor;
   (b) the sensor is located below the paver-loading conveyor.

10. The apparatus of claim 9 wherein the sensor is located on the underside of the paver-loading conveyor.

11. The apparatus of claim 1 wherein the sensor is adapted to:
   (a) direct light pulse emissions towards the front of the paving machine and to receive reflected light pulses at a rate of 20-50 pulses per second;
   (b) measure the time taken for the light pulse emissions to be reflected off of the paving machine and to return to the sensor.

12. The apparatus of claim 11 wherein the controller uses the measurement of time taken for the light pulse emissions to return to the sensor to determine the distance from the sensor to the front end of the paving machine.

13. A method for maintaining a predetermined baseline distance between a material transfer vehicle and the front end of a paving machine that is operated by a driver/operator and is being supplied with asphalt paving material by the material transfer vehicle using an apparatus for controlling movement of the material transfer vehicle wherein no components of the apparatus required to control movement of the material transfer vehicle with respect to the front of the paving machine are mounted on the paving machine, said method comprising the steps of:
   (a) providing a controller of the apparatus on the material transfer vehicle, said controller:
      (i) including a controller's memory;
      (ii) being operatively connected to a propulsion control mechanism for controlling the speed of the material transfer vehicle and a braking control mechanism for controlling the braking of the material transfer vehicle;

(b) providing a sensor of the apparatus on the material transfer vehicle, said sensor being:
  (i) operatively connected to the controller;
  (ii) located and adapted to execute non-contact sensor scan passes across the front end of the paving machine to determine the distance from the sensor to the paving machine, with each sensor scan pass employing a plurality of discrete light pulse emissions;
  (iii) adapted to communicate to the controller distance information from the sensor to the front end of the paving machine;
(c) positioning the material transfer vehicle at the predetermined baseline distance from the front end of the paving machine;
(d) activating the sensor to calibrate the system by emitting light scans at a plurality of different angular locations across the front end of the paving machine;
(e) storing the distances measured by the sensor in executing the light scans at a plurality of different angular locations in the controller's memory as baseline points that are indicative of a predetermined baseline distance of the material transfer vehicle from the paving machine;
(f) operating the paving machine to begin paving operations;
(g) activating the sensor to execute a plurality of non-contact sensor scans across the front end of the paving machine during operation of the paving machine to determine the distance from the sensor to the front end of the paving machine;
(h) transmitting the distance information obtained by the non-contact sensor scans during operation of the paving machine to the controller;
(i) causing the controller to compare the distance information obtained by the plurality of non-contact sensor scans during operation of the paving machine with the baseline points stored in the controller's memory;
(j) causing the controller to transmit signals to the propulsion control mechanism for the material transfer vehicle and the braking control mechanism for the material transfer vehicle in order to cause these mechanisms to maintain the predetermined baseline distance with respect to the paving machine.

14. The method of claim 13:
(a) which includes providing a status light assembly including a status light on the material transfer vehicle, said status light assembly being operatively connected to the controller;
(b) operating the controller to illuminate the status light if the material transfer vehicle is not at the predetermined baseline distance from the paving machine.

15. The method of claim 13:
(a) which includes providing a status light assembly including a plurality of status lights on the material transfer vehicle, said status light assembly being operatively connected to the controller;
(b) operating the controller to illuminate a first status light on the status light assembly when the material transfer vehicle is within a preselected window that includes the predetermined baseline distance from the paving machine;
(c) operating the controller to illuminate a second status light on the status light assembly when the material transfer vehicle is in the preselected window but drifting towards the paving machine;
(d) operating the controller to illuminate a third status light on the status light assembly when the material transfer vehicle is closer than the predetermined baseline distance from the paving machine;
(e) operating the controller to illuminate a fourth status light on the status light assembly when the material transfer vehicle is within the preselected window, but drifting away from the paving machine;
(f) operating the controller to illuminate a fifth status light on the status light assembly when the material transfer vehicle is farther away from the predetermined baseline distance from the paving machine.

16. The method of claim 13 wherein the controller is adapted to cause the braking control mechanism of the material transfer vehicle to bring the material transfer vehicle to a halt if the sensor is unable to locate the front end of the paving machine.

17. An apparatus for controlling the movement of a material transfer vehicle with respect to the front end of a paving machine that is operated by a driver/operator and is being supplied with asphalt paving material by the material transfer vehicle, said apparatus comprising:
(a) a controller that is mounted on the material transfer vehicle, said controller being operatively connected to:
  (i) a propulsion control mechanism for controlling the speed of the material transfer vehicle; and
  (ii) a braking control mechanism for controlling the braking of the material transfer vehicle;
(b) a sensor that is mounted on the material transfer vehicle, said sensor being:
  (i) operatively connected to the controller;
  (ii) located and adapted to execute a plurality of non-contact sensor scan passes across the front end of the paving machine to determine the distance from the sensor to the paving machine, with each sensor scan pass employing a plurality of discrete light pulse emissions;
  (iii) adapted to communicate to the controller distance information from the sensor to the front end of the paving machine;
wherein the apparatus includes exclusively components that are mounted on the material transfer vehicle and no component of the apparatus required to control movement of the material transfer vehicle with respect to the front of the paving machine is mounted on the paving machine.

18. The system of claim 1 wherein all components of the apparatus that are required to control movement of the material transfer vehicle with respect to the front of the paving machine are mounted exclusively on the material transfer vehicle.

19. The method of claim 13 wherein all components of the apparatus that are required to control movement of the material transfer vehicle with respect to the front of the paving machine are mounted exclusively on the material transfer vehicle.

* * * * *